United States Patent [19]

Simpukas

[11] Patent Number: 6,139,890
[45] Date of Patent: Oct. 31, 2000

[54] METHOD OF EXTENDING THE SHELF LIFE AND/OR REDUCING LEVEL OF BACTERIAL CONTAMINATION ON FRUITS AND VEGETABLES

[75] Inventor: John Simpukas, Atlanta, Ga.

[73] Assignee: Bio-Tek Industries, Inc., Atlanta, Ga.

[21] Appl. No.: 09/119,646

[22] Filed: Jul. 21, 1998

[51] Int. Cl.⁷ ...................................................... A23B 7/10
[52] U.S. Cl. ...................... 426/321; 426/331; 426/333; 426/335; 426/268
[58] Field of Search ..................... 426/333, 335, 426/268

[56] References Cited

U.S. PATENT DOCUMENTS

| | | | |
|---|---|---|---|
| 2,154,449 | 4/1939 | Hoffman et al. | 99/90 |
| 2,383,907 | 8/1945 | Beechem et al. | 99/156 |
| 2,790,717 | 4/1957 | Robbins | 99/154 |
| 2,819,972 | 1/1958 | Robbins | 99/154 |
| 2,819,973 | 1/1958 | Robbins | 99/154 |
| 2,895,990 | 7/1959 | Larrison et al. | 250/540 |
| 2,898,372 | 8/1959 | Anderson | 260/540 |
| 3,692,534 | 9/1972 | Ueno et al. | 99/90 |
| 3,812,269 | 5/1974 | Mueller et al. | 426/227 |
| 3,836,655 | 9/1974 | Kensler et al. | 424/286 |
| 3,898,344 | 8/1975 | Masuoka et al. . | |
| 3,925,559 | 12/1975 | Glabe et al. | 426/2 |
| 4,015,018 | 3/1977 | Glabe et al. | 426/2 |
| 4,016,294 | 4/1977 | Glabe et al. | 426/72 |
| 4,032,464 | 6/1977 | Mausner . | |
| 4,034,117 | 7/1977 | Glabe | 426/335 |
| 4,067,999 | 1/1978 | Glabe et al. | 424/317 |
| 4,107,335 | 8/1978 | Glickstein et al. | 426/96 |
| 4,112,122 | 9/1978 | Long | 426/19 |
| 4,161,543 | 7/1979 | Anderson et al. | 424/173 |
| 4,178,369 | 12/1979 | Glabe et al. | 424/177 |
| 4,178,370 | 12/1979 | Glabe et al. | 426/2 |
| 4,196,194 | 4/1980 | Glabe et al. | 424/177 |
| 4,196,195 | 4/1980 | Glabe et al. | 426/62 |
| 4,199,606 | 4/1980 | Bland | 426/331 |
| 4,299,854 | 11/1981 | Glabe et al. | 426/331 |
| 4,336,273 | 6/1982 | Lee | 426/321 |
| 4,338,336 | 7/1982 | Glabe et al. | 426/331 |
| 4,357,358 | 11/1982 | Schanze | 426/62 |
| 4,401,624 | 8/1983 | Atwater | 422/12 |
| 4,425,251 | 1/1984 | Gancy . | |
| 4,505,826 | 3/1985 | Horton . | |
| 4,514,425 | 4/1985 | Rebhan | 426/93 |
| 4,721,622 | 1/1988 | Kingham et al. | 426/94 |
| 4,844,929 | 7/1989 | Kingsley | 426/93 |
| 4,927,657 | 5/1990 | Antaki et al. | 426/589 |
| 5,034,405 | 7/1991 | Jakubowski | 514/369 |
| 5,130,445 | 7/1992 | Burg et al. | 549/222 |
| 5,335,855 | 8/1994 | Borod | 237/152 |
| 5,457,083 | 10/1995 | Muia et al. | 504/128 |
| 5,641,425 | 6/1997 | McKedy et al. | 252/188.28 |
| 5,693,359 | 12/1997 | Wood | 426/650 |
| 5,746,937 | 5/1998 | McKedy et al. | 252/188.28 |

FOREIGN PATENT DOCUMENTS

| | | |
|---|---|---|
| 848055 | 3/1977 | Belgium . |
| 848056 | 3/1977 | Belgium . |
| 1067745 | 12/1979 | Canada . |
| 1087471 | 6/1994 | China . |
| 2344594 | 3/1975 | Germany . |
| 51-22825 | 2/1976 | Japan . |
| 56-113285 | 9/1981 | Japan . |
| 40135448 | 5/1992 | Japan . |
| 07059846 | 3/1995 | Japan . |
| 2047455 | 2/1994 | Spain . |
| 2013470 | 8/1979 | United Kingdom . |
| WO9106495 | 5/1991 | WIPO . |
| WO9629895 | 10/1996 | WIPO . |
| WO9740705 | 11/1997 | WIPO . |

OTHER PUBLICATIONS

Solomons, T.W., Organic Chemistry, 4th Ed., John Wiley & Sons, p. 52, 72–73 and 820–821, 1988.

Abstract, "Use of sodium acetate and sodium diacetate as flavoring agents in meat and poultry products", Food Safety Inspection Service, USDA, Washington, DC, 20250, Fed. Regist. (1997), 62(120), 33744–33746, Jun. 23, 1997, CODEN: FEREAC;ISSN: 0097–6326.

Abstract, Degan et al, "Evaluation of lactic acid bacterium fermentation products and food–grade chemicals to control *Listeria monocytogenes* in blue crab (*Callinectes sapidus*) meat", Department of Food Microbiology & Toxicology, University of Wisconsin, Madison, WI, 53706, Appl. Environ. Microbiol. (1994), 60(9), 3198–203, CODEN: AEMIDF;ISSN: 0099–2240.

Abstrat, Shelef et al, "Inhibition of *Listeria monocytogenes* and other bacteria by sodium diacetate", Department of Nutrition and Food Science, Wayne State University, Detroit, MI, 48202, J. Food Saf. (1994), 14(2), 103–15, CODEN: JFSADP;ISSN: 0149–6085.

Abstract, Schlyter et al, "The effects of diacetate with nitrite, lactate, or pediocin on the viability of *Listeria monocytogenes* in turkey slurries", Dep. Food Microbiol., Univ. Wisconsin, Madison, WI, Int. J. food Microbiol. (1993), 19(4), 271–81, CODEN: IJFMDD;ISSN: 0168–1605.

Abstract, Schlyter et al, "Evaluation of sodium diacetate and ALTA 2341 on viability of *Listeria monocytogenes* in turkey slurries", Food Res. Inst., Univ. Wisconsin, Madison, WI, J. Food Prot. (1993), 56(9), 808–10, CODEN: JFPRDR; ISSN: 0362–028X.

*Primary Examiner*—Milton Cano
*Assistant Examiner*—Philip DuBois
*Attorney, Agent, or Firm*—Oblon, Spivak, McClelland, Maier & Neustadt, P.C.

[57] ABSTRACT

Methods and compositions for producing fruits or vegetables having an extended shelf life and/or a reduces level of bacterial contamination.

22 Claims, No Drawings

6,139,890

METHOD OF EXTENDING THE SHELF LIFE AND/OR REDUCING LEVEL OF BACTERIAL CONTAMINATION ON FRUITS AND VEGETABLES

BACKGROUND OF THE INVENTION

1. Field of the Invention

The present invention relates methods and compositions for producing fruits and vegetables having an extended shelf life and/or a reduced level of bacterial contamination.

2. Description of the Background

Spoilage of fruits and vegetables prior to consumer purchase and consumption remains a major problem in the agricultural industry. Simply put, consumers will not purchase and consume fruits and vegetables that show signs of spoilage. Accordingly, spoilage is a major source of lost revenue for the agricultural industry.

Methods of extending the shelf life of fruits and vegetables are, therefore, extremely important to this industry. Many attempts have been made to preserve fruits and vegetables against spoilage. One method is canning, where the fruits and vegetables are sterilized by heat processing and stored in a sealed can (see, for example, U.S. Pat. No. 4,336,273). Pickling is another widely used preservation technique. In pickling, the foodstuff is immersed in an aqueous pickling medium, which generally contains a high concentration of salt (see, for example, U.S. Pat. No. 4,844,929).

A major drawback of canning and pickling methods is that the organolectic qualities, e.g., taste and texture, of the fruits and vegetables are altered. A major goal in the agricultural industry is to provide simple methods for extending the shelf life of fruits and vegetables which do not alter the organolectic qualities of these foodstuffs.

SUMMARY OF THE INVENTION

It is an object of the present invention to provide methods of producing fruits or vegetables having an extended shelf life.

It is another object of the present invention to provide methods of producing fruits or vegetables having a reduced level of bacterial contamination.

It is another object of the present invention to provide compositions and kits which can be used to practice the object methods described above.

The present invention is based on the discovery that the shelf life of fruits and vegetables can be extended by treating these food products with an aqueous solution containing a carboxylic acid and a carboxylic acid salt and then rinsing in order to remove acid and the salt. The treating and rinsing steps remove bacterial contamination from the treated surfaces, without adversely affecting the organoleptic properties of the fruits and vegetables.

Accordingly, the objects of the present invention, and others, may be accomplished with a method of producing fruits or vegetables having an extended shelf life and/or a reduced level of bacterial contamination, comprising:

(A) applying to a surface of a fruit or a vegetable a first aqueous solution comprising:

(i) 1 equivalent of a carboxylic acid represented by the formula $R^1C(O)OH$, and
(ii) 0.75 to 1.25 equivalents of a carboxylic acid salt represented by the formula $[R^2C(O)O^-]_x[^zM]_y$.

In one embodiment, following application of the first aqueous solution as described above, the method also includes:

(B) rinsing the surface of the fruit or vegetable with a second aqueous solution, where $R^1$ and $R^2$ are each, independently, a hydrocarbon group having 1 to 6 carbon atoms, M is a cation having a valence z, and x, y and z are each, independently, a positive integer so as to satisfy the relationship $(-1)x+z(y)=0$.

A more complete appreciation of the invention and many of the attendant advantages thereof will be readily obtained as the same becomes better understood by reference to the following detailed description.

DETAILED DESCRIPTION OF THE PREFERRED EMBODIMENTS

An important feature of the present invention is that the organoleptic properties of the treated fruits and vegetables may not be significantly altered. Importantly, the method of the invention does not impart an unnatural taste, odor and/or mouth feel to the fruits and vegetables (e.g., an acidic taste or odor). Since the aqueous solution containing the carboxylic acid and the carboxylic acid is applied for a relatively brief period of time, the treated fruits and vegetables are not pickled by the inventive method.

A wide variety of fruits and vegetables may be used in the present invention. Specific examples include apples, apricots, bananas, berries (strawberries, raspberries, boysenberries, blackberries, loganberries, youngberries, cranberries, blueberries, mulberries, currants, dewberries, gooseberries), cherries, kiwis, limes, lemons, melons (cantaloupe, honeydew, watermelon, musk melons, Persian melons), nectarines, pineapples, plantains, oranges, pears, grapefruit, dates, figs, grapes, raisins, guavas, plums, prunes, passion fruit, tangerines, pomegranates, persimmons, nuts (peanuts, cashews, pine nuts), artichokes, broccoli, bean sprouts, cauliflower, carrots, onions, spinach, lettuce, cucumbers, beets (sugar beets, red beets), cardoon, chayote, endive, leeks, okra, green onions, scallions, shallots, parsnips, potatoes, cabbage, sweet potatoes, yams, asparagus, avocados, legumes (peas, string beans, lima beans, kidney beans, wax beans), Brussels sprouts, tomatoes, kohlrabi, rutabaga, eggplant, squash (summer, winter, acorn, butternut, spaghetti, zucchini, yellow straightneck), turnips, celery, pumpkins, peppers (green peppers, red peppers, hot peppers), radishes, mushrooms (button, portabella, shitake, crimini). Other fruits and vegetables arc listed in *The New Good Housekeeping* Cookbook (1986, The Hearst Corporation, pages 351–430), incorporated herein by reference.

The present invention is preferably used with fresh fruits and vegetables after they have been subjected to preliminary processing to obtain a form suitable for consumption. Such preliminary processing may include washing, peeling, seed removal, blanching and cutting into halves, chunks, slices or strips. In some cases no preliminary processing is necessary and the method can be applied directly to the harvested form of the fruit or vegetable.

The aqueous solution containing the carboxylic acid represented by the formula $R^1C(O)OH$ and the carboxylic acid salt represented by the formula $[R^2C(O)O^-]_x[^zM]_y$ is applied to a surface of the fruit or vegetable. The aqueous solution may be applied by spraying over the exposed outer surface of the fruit or vegetable. Alternatively, the fruit or vegetable may be immersed in the solution. It is particularly preferred to coat the entire exposed outer surface of the fruit or vegetable for the maximum beneficial effect. Methods and apparatus for spraying with or immersing fruits and vegetables in aqueous solutions are well-known in the agricultural industry. One method of applying the solution is to spray the fruits and vegetables with a conventional spray bottle, such as the type used to water houseplants. In this, case a fine mist can be applied to the outer exposed surfaces of the fruits and vegetables. In a particularly preferred embodiment, the solution applied in the form of a stream from a bottle capable of discharging a stream of an aqueous solution. In this embodiment, the outer exposed surfaces of the fruits and vegetables are "drenched" by the stream.

The group $R^1$ or $R^2$ may be an alkyl group having 1 to 6 carbon atoms or an aryl group, and may be the same or different. Preferably, $R^1$ and $R^2$ are the same. Specific examples of alkyl groups include methyl, ethyl, propyl, iso-propyl, butyl, iso-butyl, tert-butyl, pentyl, and hexyl. In a particularly preferred embodiment, $R^1$ and $R^2$ are each ethyl.

In the formula representing the carboxylic acid salt, M is a cation having, a valence z. Preferably, M is a metal ion or an ammonium ion (e.g., $NH_4^+$, or a mono-, di-, tri- or tetraalkyl ammonium ion, where the alkyl groups preferably have 1, 2, 3, 4, 5 or 6 carbon atoms). More preferably, M is a sodium, potassium, calcium or magnesium ion. Even more preferably, M is a sodium or potassium ion. Most preferably, M is a sodium ion.

The aqueous solution contains one equivalent of the carboxylic acid and 0.75 to 1.25 equivalents of the carboxylic acid salt, i.e, the molar ratio of the acid to the salt is 1 to 0.75 to 1.25. Preferably, the solution contains 0.9 to 1.1 equivalents of the carboxylic acid salt to one equivalent of the carboxylic acid. More preferably, the solution contains 0.95 to 1.05 equivalents of the carboxylic acid salt to one equivalent of the carboxylic acid. These ranges include all specific values and subranges therebetween, such as 0.85, 1.0 and 1.05. For the purposes of the present invention the carboxylic acid and the carboxylic acid salt may include large quantities of dissociated species, e.g, $R^1C(O)O^-$, $R^2C(O)O^-$, $^zM$, since these compounds are dissolved in water.

The total amount, expressed in terms of wt %, of the carboxylic acid and the carboxylic acid metal salt may be 0.1 to 80%. More preferably, the total amount of the carboxylic acid and the carboxylic acid metal salt is 5 to 60% by weight, even more preferably 10 to 50% by weight and, most preferably, 15 to 35% by weight. These ranges include all specific values and subranges therebetween, including, 0.2, 0.5, 1, 2, 8, 12, 18, 20, 25, 30, 40, 45, 55, 60, 65, 70 or 75% by weight. The pH of the aqueous solution is preferably between 4 and 7, inclusive of all specific values and subranges therebetween such as 4.2. 4.5, 4.8, 5.0, 5.2, 5.5, 5.8, 6.0, 6.2, 6.5 and 6.8.

The aqueous solution containing the carboxylic acid and the carboxylic acid salt may be prepared by dissolving compounds such as sodium diacetate or sodium dipropionate, which are compounds recognized to have a definite chemical composition having the formula $RC(O)O^{-+}Na \cdot RC(O)OH$ (R is ethyl or propyl), in water at the appropriate concentration. Alternatively, the solution may be prepared by treating an aqueous solution of the carboxylic acid with an appropriate hydroxide salt, either as a solid or an aqueous solution, and then adjusting to the desired final concentration. The solution may also be prepared by adding the carboxylic acid to a solution of the carboxylic acid metal salt in water, and vice versa. Most preferably, a diacetate salt, e.g., sodium diacetate, is dissolved in water at the appropriate final concentration.

The aqueous solution may contain other components in addition to the carboxylic acid and the carboxylic acid salt, provided that the solutions retains the ability to extend the shelf life of the treated fruits and vegetables. Such additional components include, for example, other carboxylic acids (e.g., citric, tartaric, malic, fumaric, etc.) and carboxylic acid salts (e.g., salts of e.g., citric, tartaric, malic, and fumaric acid, etc., alcohols (such as propylene glycol), and surfactants (e.g., polysiloxanes). These components each generally comprise 0 to less than 5% by weight of the solution, inclusive of all specific values and subranges therebetween (e.g., 0.01, 0.02, 0.05, 0.1, 0.2, 0.5, 1, 2, 3 or 4% by weight).

The aqueous solution containing the carboxylic acid and the carboxylic acid metal salt is applied for a time sufficient to produce fruits and vegetables having extended shelf life and/or a reduced level of bacterial contamination. In one embodiment, the aqueous solution is applied to the fruit or vegetable for 1 second to 30 minutes. More preferably, the aqueous solution is applied for a time period from 1 second to 15 minutes, more preferably, from 30 seconds to 5 minutes and most preferably from 30 seconds to 3 minutes. These time periods include all specific value and subranges therebetween, including, 2, 5, 10, 20, 40, 45, 50 and 55 seconds, and 1, 2, 3, 10, 15, 20 and 25 minutes.

After the application of the aqueous solution containing the carboxylic acid and the carboxylic acid metal salt is complete, the fruit or vegetable may be rinsed in order to remove the excess organic materials from the surfaces of the fruit or vegetable. The preferred rinse solution is tap water, i.e., water that contains advantageous impurities derived from its natural source. The time period for the rinse may be, for example, from 0 to 30 minutes. Preferably, the rinse is conducted for 0.5 second to 5 minutes, more preferably for 1 second to 2 minutes and, most preferably, for 5 seconds to 1 minute. These time periods include all specific values and subranges therebetween, such as 0.1 second, 0.2 second, 2 seconds, 10 seconds, 15 seconds, 30 seconds, 45 seconds, 1.5 minutes, 2 minutes, 3 minutes, 10 minutes. 15 minutes 20 minutes and 25 minutes.

In a one embodiment, the fruit or vegetable is rinsed with this second aqueous solution within 60 minutes after completing the application of the aqueous solution containing the carboxylic acid and the carboxylic acid salt. Preferably, the fruit or vegetable is rinsed within 30 minutes after applying the aqueous solution containing the carboxylic acid and the carboxylic acid salt. More preferably, the fruit or vegetable is rinsed within 15 minutes after applying the aqueous solution containing the carboxylic acid and the carboxylic acid salt. Even more preferably, the fruit or vegetable is rinsed within 10 minutes after applying the aqueous solution containing the carboxylic acid and the carboxylic acid salt. Still more preferably, the fruit or vegetable is rinsed within 5 minutes after applying the aqueous solution containing the carboxylic acid and the carboxylic acid salt. Most preferably, the rinsing step begins in 1 minute of less after applying the aqueous solution containing the carboxylic acid and the carboxylic acid salt.

The applying and rinsing steps may be conducted at any convenient temperature. In one embodiment, these steps are conducted at 35 to 110° F. Preferably, these steps are conducted at 45 to 90° F., more preferably at 55 to 85° F., and, most preferably, at 60 to 80° F. These temperature ranges include all specific values and subranges therebetween, including 40, 50, 65, 70, 75, 95, 100 and 105° F.

Following the applying and rinsing steps described above, the fruit or vegetable may be dried. Drying may be accomplished by air-drying, i.e., allowing the fruit or vegetable to dry naturally. Alternatively, any of the well-known drying techniques may be used to remove the rinse solution from the surface of the fruit or vegetable.

Following the treatment process described above, the fruit or vegetable may be packaged and shipped to a commercial retail outlet, e.g., a grocery store, and marketed for human consumption. If the method of the present invention is practiced by the ultimate consumer, i.e., the individual who will eat the treated fruit or vegetable, the treated product may be stored as usual and consumed at the desired time.

The level of bacterial contamination on the surfaces of the fruits and vegetables may be measured by any of the well-known techniques used in the art. For example, the aerobic plate count (APC) may be determined according to AOAC 990.12. The total coliform count (TCC) may be determined according to AOAC 991.14. The *E. coli* count may be determined according to AOAC 991.14.

It is preferred that the level of bacterial contamination be reduced to the lowest possible value according to the present invention. Relative to untreated fruit or fruit treated with only a tap water rinse, the level of bacterial contamination may be reduced at least 2-fold, at least 5-fold, at least 10-fold, at least 25-fold, at least 50-fold, at least 100-told, at least 250-fold, at least 500-fold, at least 1,000-fold, at least 1,500-fold, at least 2,000-fold, at least 5,000-fold, at least 10,000-fold, at least 25,000-fold, at least 50,000-fold, at least 75,000-fold, and up to at least 100,000-fold.

The present invention also provides a kit for producing fruits and vegetables having an extended shelf life and/or reduced level of bacterial contamination. The kit includes at least one compound which when dissolved in water produces an aqueous solution containing 1 equivalent of the carboxylic acid and/or 0.75 to 1.25 equivalents of the carboxylic acid salt. Such a compound is sodium or potassium diacetate, preferably sodium diacetate. The kit may also contain the appropriate amounts of the carboxylic acid and the carboxylic acid salt (e.g., acetic acid and sodium acetate). The kit may also only include one of the carboxylic acid or the carboxylic acid salt (e.g., acetic acid or sodium acetate).

The kit also may contain instructions describing for a human user how to treat fruits and vegetables to extend the shelf life and/or reduce levels of bacterial contamination according to the present invention. Such instructions can be written text, such as a printed pages or text printed on the label of a bottle or other suitable container. Pictures and/or diagrams which instruct the user are within the scope of written instructions. The instructions can also be contained in electronic format, such as on a computer floppy disk or on a CD-ROM. An example of suitable instructions for practicing the present invention is a copy of the specification of the present patent application.

The kit may also contain a bottle in which the first aqueous solution may be stored. Such a bottle may be a spray bottle. The bottle may also have a nozzle cap which is capable of producing a liquid stream of the first aqueous solution, when, for example, the bottle is squeezed. The bottle may be premarked with volume indicators. In this case, the user can fill the bottle to the premarked indicator with water or other suitable aqueous media in order to reconstitute the first aqueous solution. Accordingly, the bottle may be filled with the component(s) of the first aqueous solution, other than water. The kit may also contain a bottle in which the rinse solution can be stored.

The kit may also contain other components of the first aqueous solution as described above, e.g., other carboxylic acids and/or surfactants.

In the present invention, it is preferred that the fruits or vegetables are other than cereal grains having a seed coat (e.g., corn, wheat rice, oats, barley, rye, milo, red millet, white millet, yellow millet). It is also preferred that the fruits or vegetables be other than foodstuffs which are typically used as or in animal feeds (e.g., alfalfa (especially alfalfa meal), soybeans (especially soybean meal), trefoil, sorghum, timothy, grasses (sudan grass, orchard grass), bluestem).

In another embodiment the first aqueous may contain less than 5% by weight, less than 4% by weight, less than 3% by weight, less than 2% by weight, less than 1% by weight of alcohols (including monoalcohols and polyols). The first aqueous solution may contain no alcohol. Specific examples of the alcohol include alcohols having 1 to 10 carbon atoms and 1 to 10 hydroxyl groups (e.g., ethanol, propylene glycol, glycerin, sorbitol and other sugar alcohols). Phytic acid and/or an extract of bamboo are also preferably not components of the first aqueous solution.

Having generally described this invention, a further understanding can be obtained by reference to certain specific examples which are provided herein for purposes of illustration only and are not intended to be limiting unless otherwise specified.

EXAMPLES

Fruits and vegetables were sprayed with a 20% (by weight) sodium diacetate aqueous solution at a two minute exposure time followed by a water rinse, versus fruits and vegetables treated only with a tap water rinse. The data below demonstrate the ability of aqueous 20% solution of sodium diacetate to reduce the Aerobic Plate Count (APC) and Total Coliform Count on fruits and vegetables when these products were wetted by spraying with the sodium diacetate solution prior to rinsing with tap water.

Example 1

| Sample: Spinach | | | |
|---|---|---|---|
| Test | Results | Units | Method |
| Treatment: Tap Water Rinse Only (Control) | | | |
| Aerobic Plate Count | >62,000 | cfu/gram | AOAC 990.12 |
| Total Coliform Count | 38,000 | cfu/gram | AOAC 991.14 |
| *E. coli* Count | <41 | cfu/gram | AOAC 991.14 |
| Treatment: 20% Sodium Diacetate Spray Application with 120 Second Exposure, Followed by Rinsing | | | |
| Aerobic Plate Count | 650 | cfu/gram | AOAC 990.12 |
| Total Coliform Count | <4 | cfu/gram | AOAC 991.14 |
| *E. coli* Count | <4 | cfu/gram | AOAC 991.14 |

Example 2

| Sample: Green Leaf Lettuce | | | |
|---|---|---|---|
| Test | Results | Units | Method |
| Treatment: Tap Water Rinse Only (Control) | | | |
| Aerobic Plate Count | >48,000 | cfu/gram | AOAC 990.12 |
| Total Coliform Count | 2,900 | cfu/gram | AOAC 991.14 |
| *E. coli* Count | <32 | cfu/gram | AOAC 991.14 |
| Treatment: 20% Sodium Diacetate Spray Application with 120 Second Exposure, Followed by Rinsing | | | |
| Aerobic Plate Count | 650 | cfu/gram | AOAC 990.12 |
| Total Coliform Count | <3 | cfu/gram | AOAC 991.14 |
| *E. coli* Count | <3 | cfu/gram | AOAC 991.14 |

Example 3

| Sample: Bean Sprouts | | | |
|---|---|---|---|
| Test | Results | Units | Method |
| Treatment: Tap Water Rinse Only (Control) | | | |
| Aerobic Plate Count | >50,000 | cfu/gram | AOAC 990.12 |
| Total Coliform Count | >5,000 | cfu/gram | AOAC 991.14 |
| *E. coli* Count | <34 | cfu/gram | AOAC 991.14 |
| Treatment: 20% Sodium Diacetate Spray Application with 120 Second Exposure, Followed by Rinsing | | | |
| Aerobic Plate Count | <37 | cfu/gram | AOAC 990.12 |
| Total Coliform Count | <4 | cfu/gram | AOAC 991.14 |
| *E. coli* Count | <4 | cfu/gram | AOAC 991.14 |

Example 4

| Sample: Cherries | | | |
|---|---|---|---|
| Test | Results | Units | Method |
| Treatment: Tap Water Rinse Only (Control) | | | |
| Aerobic Plate Count | 3,700 | cfu/gram | AOAC 990.12 |
| Total Coliform Count | 58 | cfu/gram | AOAC 991.14 |
| *E. coli* Count | <19 | cfu/gram | AOAC 991.14 |
| Treatment: 20% Sodium Diacetate Spray Application with 120 Second Exposure, Followed by Rinsing | | | |
| Aerobic Plate Count | 76 | cfu/gram | AOAC 990.12 |
| Total Coliform Count | <2 | cfu/gram | AOAC 991.14 |
| *E. coli* Count | <2 | cfu/gram | AOAC 991.14 |

Example 5

| Sample: Raspberries | | | |
|---|---|---|---|
| Test | Results | Units | Method |
| Treatment: Tap Water Rinse Only (Control) | | | |
| Aerobic Plate Count | 5,100 | cfu/gram | AOAC 990.12 |
| Total Coliform Count | 270 | cfu/gram | AOAC 991.14 |
| *E. coli* Count | <27 | cfu/gram | AOAC 991.14 |
| Treatment: 20% Sodium Diacetate Spray Application with 120 Second Exposure, Followed by Rinsing | | | |
| Aerobic Plate Count | 340 | cfu/gram | AOAC 990.12 |
| Total Coliform Count | <3 | cfu/gram | AOAC 991.14 |
| *E. coli* Count | <3 | cfu/gram | AOAC 991.14 |

Example 6

| Sample: Broccoli | | | |
|---|---|---|---|
| Test | Results | Units | Method |
| Treatment: Tap Water Rinse Only (Control) | | | |
| Aerobic Plate Count | >27,000 | cfu/gram | AOAC 990.12 |
| Total Coliform Count | 600 | cfu/gram | AOAC 991.14 |
| *E. coli* Count | <18 | cfu/gram | AOAC 991.14 |
| Treatment: 20% Sodium Diacetate Spray Application with 120 Second Exposure, Followed by Rinsing | | | |
| Aerobic Plate Count | 54 | cfu/gram | AOAC 990.12 |
| Total Coliform Count | <2 | cfu/gram | AOAC 991.14 |
| *E. coli* Count | <2 | cfu/gram | AOAC 991.14 |

Example 7

| Sample: Blueberries | | | |
|---|---|---|---|
| Test | Results | Units | Method |
| Treatment: Tap Water Rinse Only (Control) | | | |
| Aerobic Plate Count | 27,000 | cfu/gram | AOAC 990.12 |
| Total Coliform Count | 100 | cfu/gram | AOAC 991.14 |
| *E. coli* Count | <28 | cfu/gram | AOAC 991.14 |

-continued

Sample: Blueberries

| Test | Results | Units | Method |
|---|---|---|---|
| Treatment: 20% Sodium Diacetate Spray Application with 120 Second Exposure, Followed by Rinsing | | | |
| Aerobic Plate Count | <26 | cfu/gram | AOAC 990.12 |
| Total Coliform Count | <3 | cfu/gram | AOAC 991.14 |
| E. coli Count | <3 | cfu/gram | AOAC 991.14 |

Example 8

Sample: Strawberries

| Test | Results | Units | Method |
|---|---|---|---|
| Treatment: Tap Water Rinse Only (Control) | | | |
| Aerobic Plate Count | 10,000 | cfu/gram | AOAC 990.12 |
| Total Coliform Count | 1,100 | cfu/gram | AOAC 991.14 |
| E. coli Count | <15 | cfu/gram | AOAC 991.14 |
| Treatment: 20% Sodium Diacetate Spray Application with 120 Second Exposure, Followed by Rinsing | | | |
| Aerobic Plate Count | 930 | cfu/gram | AOAC 990.12 |
| Total Coliform Count | <1 | cfu/gram | AOAC 991.14 |
| E. coli Count | <1 | cfu/gram | AOAC 991.14 |

Example 9

Sample: Cantaloupe

| Test | Results | Units | Method |
|---|---|---|---|
| Treatment: Tap Water Rinse Only (Control) | | | |
| Aerobic Plate Count | >24,000 | cfu/gram | AOAC 990.12 |
| Total Coliform Count | 290 | cfu/gram | AOAC 991.14 |
| E. coli Count | <16 | cfu/gram | AOAC 991.14 |
| Treatment: 20% Sodium Diacetate Spray Application with 120 Second Exposure, Followed by Rinsing | | | |
| Aerobic Plate Count | 1,200 | cfu/gram | AOAC 990.12 |
| Total Coliform Count | <2 | cfu/gram | AOAC 991.14 |
| E. coli Count | <2 | cfu/gram | AOAC 991.14 |

Example 10

Application testing was performed with 20% sodium diacetate aqueous solution sprayed on fruits and vegetables inoculated with Hemorrhagic E. coli O157:H7, versus positive control fruits and vegetables inoculated with Hemorragic *E. coli* 0157:117 and rinsed with tap water. The data herein demonstrate the ability of an aqueous 20% solution of sodium diacetate, sprayed on fruits and vegetables, and exposed for 120 seconds, to significantly reduce the level of Hemorrhagic *E. coli* O157:H7.

| Test | Results | Units | Method |
|---|---|---|---|
| Sample: Blueberries | | | |
| Treatment: Positive Control Tap Water Rinse Only | | | |
| Hemorrhagic *E coli* O157:H7 | 33,000 | cfu/g | 3M Petrifilm/HEC O157:H7-ELISA |
| Treatment: 20% Sodium Diacetate Sprayed with 120 Second Exposure, tap water rinse | | | |
| Hemorrhagic *E.coli* O157:H7 | <1 | cfu/g | 3M Petrifilm/HEC O157:H7-ELISA |
| Sample: Celery | | | |
| Treatment: Positive Control Tap Water Rinse Only | | | |
| Hemorrhagic *E. coli* O157:H7 | 52,000 | cfu/g | 3M Petrifilm/HEC O157:H7-ELISA |
| Treatment: 20% Sodium Diacetate Sprayed with 120 Second Exposure, tap water rinse | | | |
| Hemorrhagic *E. coli* O157:H7 | 19 | cfu/g | 3M Petrifilm/HEC O157:H7-ELISA |
| Sample: Cantaloupe | | | |
| Treatment: Positive Control Tap Water Rinse Only | | | |
| Hemorrhagic *E. coli* O157:H7 | 62,000 | cfu/g | 3M Petrifilm/HEC O157:H7-ELISA |
| Treatment: 20% Sodium Diacetate Sprayed with 120 Second Exposure, tap water rinse | | | |
| Hemorrhagic *E. coli* O157:H7 | 64 | cfu/g | 3M Petrifilm/HEC O157:H7-ELISA |
| Sample: Carrots | | | |
| Treatment: Positive Control Tap Water Rinse Only | | | |
| Hemorrhagic *E. coli* O157:H7 | 22,000 | cfu/g | 3M Petrifilrn/HEC O157:H7-ELISA |
| Treatment: 20% Sodium Diacetate Sprayed with 120 Second Exposure, tap water rinse | | | |

-continued

| Test | Results | Units | Method |
|------|---------|-------|--------|
| Hemorrhagic E. coli O157:H7 | 3 | cfu/g | 3M Petrifilm/HEC O157:H7-ELISA |

Sample: Honeydew Melons

Treatment: Positive Control Tap Water Rinse Only

| Hemorrhagic E. coli O157:H7 | 660,000 | cfu/g | 3M Petrifilm/HEC O157:H7-ELISA |

Treatment: 20% Sodium Diacetate Sprayed with 120 Second Fxposure, tap water rinse

| Hemorrhagic E. coli O157:H7 | 72 | cfu/g | 3M Petrifilm/HEC O157:H7-ELISA |

Sample: Bean Sprouts

Treatment: Positive Control Tap Water Rinse Only

| Hemorrhagic E. coli O157:H7 | 560,000 | cfu/g | 3M Petrifilm/HEC O157:H7-ELISA |

Treatment: 20% Sodium Diacetate Sprayed with 120 Second Exposure, tap water rinse

| Hemorrhagic E. coli O157:H7 | <2 | cfu/g | 3M Petrifilm/HEC O157:H7-ELISA |

Sample: Mushrooms

Treatment: Positive Control Tap Water Rinse Only

| Hemorrhagic E. coli O157:H7 | 150,000 | cfu/g | 3M Petrifilm/HEC O157:H.7-ELISA |

Treatment: 20% Sodium Diacetate Sprayed with 120 Second Exposure, tap water rinse

| Hemorrhagic E. coli O157:H7 | <1 | cfu/g | 3M Petrifilm/HEC O157:H7-ELISA |

Sample: Strawberries

Treatment: Positive Control Tap Water Rinse Only

| Hemorrhagic E. coli O157:H7 | 4,900 | cfu/g | 3M Petrifilm/HEC O157:H7-ELISA |

Treatment: 20% Sodium Diacetate Sprayed with 120 Second Exposure, tap water rinse

| Hemorrhagic E. coli O157:H7 | 26 | cfu/g | 3M Petrifilm/HEC O157:H7-ELISA |

Sample: Tomatoes

Treatment: Positive Control Tap Water Rinse Only

| Hemorrhagic E. coli O157:H7 | 77,000 | cfu/g | 3M Petrifilm/HEC O157:H7-ELISA |

Treatment: 20% Sodium Diacetate Sprayed with 120 Second Exposure, tap water rinse

| Hemorrhagic E. coli O157:H7 | <1 | cfu/g | 3M Petrifilm/HEC O157:H7-ELISA |

Sample: Green Leaf Lettuce

Treatment: Positive Control Tap Water Rinse Only

| Hemorrhagic E. coli O157:H7 | 44,000 | cfu/g | 3M Petrifilm/HEC O157:H7-ELISA |

Treatment: 20% Sodium Diacetate Sprayed with 120 Second Exposure, tap water rinse

| Hemorrhagic E. coli O157:H7 | <2 | cfu/g | 3M Petrifilm/HBC O157:H7-ELISA |

Obviously, numerous modifications and variations of the present invention are possible in light of the above teachings. It is therefore to be understood that within the scope of the appended claims, the invention may be practiced otherwise than as specifically described herein.

What is claimed is:

1. A method of producing fruits or vegetables having an extended shelf life and/or a reduced level of bacterial contamination, comprising:

(A) applying to an outer surface of a fruit or a vegetable an effective amount of a first aqueous solution comprising:
   (i) 1 equivalent of a carboxylic acid represented by the formula $R^1C(O)OH$, and
   (ii) 0.75 to 1.25 equivalents of a carboxylic acid salt represented by the formula $(R^2C(O)O^-)_x(^zM)_y$; followed by (B) rinsing the surface of the fruit or vegetable with a second aqueous solution, wherein the first aqueous is applied to the outer surface of the fruit or vegetable for 1 second to 5 minutes, the fruit or vegetable is rinsed with the second aqueous solution within 60 minutes after completing the application to the outer surface of the fruit or vegetable, the total amount of (i) and (ii) in the first aqueous solution is 0.1 to 80% by weight, $R^1$ and $R^2$ are each, independently, a hydrocarbon group having 1 to 6 carbon atoms, M is a cation having a valence z, and x, y and z are each, independently, a positive integer so as to satisfy the relationship $(-1)x+z(y)0$.

2. The method of claim 1, wherein the fruit or vegetable is selected from the group consisting of apples, apricots, bananas, berries, cherries, kiwis, limes, lemons, melons, nectarines, pineapples, plantains, oranges, pears, grapefruit, dates, figs, grapes, raisins, guavas, plums, prunes, passion fruit, tangerines, pomegranates, persimmons, nuts, artichokes, broccoli, bean sprouts, cauliflower, carrots, onions, spinach, lettuce, cucumbers, beets, cardoon, chayote, endive, leeks, okra, green onions, scallions, shallots, parsnips, potatoes, cabbage, sweet potatoes, yams, asparagus, avocados, legumes, Brussels sprouts, tomatoes, kohlrabi, rutabaga, eggplant, squash, turnips, celery, pumpkins, peppers, radishes and mushrooms.

3. The method of claim 1, wherein $R^1$ and $R^2$ are each, independently, an alkyl group having 2 to 4 carbon atoms.

4. The method of claim 1, wherein M is selected from the group consisting of sodium, potassium, calcium and magnesium.

5. The method of claim 1, wherein $R^1$ and $R^2$ are each ethyl and M is selected from the group consisting of sodium, potassium, calcium and magnesium.

6. The method of claim 1, wherein the total amount of (i) and (ii) in the first aqueous solution is 0.1% to 70% by weight.

7. The method of claim 1, wherein the total amount of (i) and (ii) in the first aqueous solution is 5 to 30% by weight.

8. The method of claim 1, wherein the first aqueous solution contains 0.95 to 1.05 equivalents of the carboxylic acid salt.

9. The method of claim 1, wherein the first aqueous solution is applied to the fruit or vegetable for 1 second to 3 minutes.

10. The method of claim 1, wherein the fruit or vegetable is rinsed with the second aqueous solution within 15 minutes after completing the application of the first aqueous solution.

11. The method of claim 1, wherein the second aqueous solution consists essentially of water and adventitious impurities.

12. The method of claim 1, wherein the fruit or vegetable is other than a cereal grain having a seed coat.

13. The method of claim 1, wherein the fruit or vegetable is selected from the group consisting of apples, apricots, bananas, berries, cherries, kiwis, limes, lemons, melons, nectarines, pineapples, plantains, oranges, pears, grapefruit, dates, figs, grapes, raisins, guavas, plums, prunes, passion fruit, tangerines, pomegranates, persimmons, nuts, artichokes, broccoli, bean sprouts, cauliflower, carrots, onions, spinach, lettuce, cucumbers, beets, cardoon, chayote, endive, leeks, okra, green onions, scallions, shallots, parsnips, potatoes, cabbage, sweet potatoes, yams, asparagus, avocados, legumes, Brussels sprouts, tomatoes, kohlrabi, rutabaga, eggplant, squash, turnips, celery, pumpkins, peppers, radishes and mushrooms, $R^1$ and $R^2$ are each, independently, an alkyl group having 2 to 4 carbon atoms, M is selected from the group consisting of sodium, potassium, calcium and magnesium, the first aqueous solution contains 0.1 to 70% by weight, in total, of (i) and (ii), the first aqueous solution is applied to the fruit or vegetable for 1 second to 3 minutes, and the fruit or vegetable is rinsed with the second aqueous solution within 15 minutes after completing the application of the first aqueous solution.

14. The method of claim 13, wherein $R^1$ and $R^2$ are each ethyl, and

M is sodium or potassium.

15. The method of claim 14, wherein the second aqueous solution consists essentially of water and adventitious impurities.

16. The method of claim 1, wherein the fruit or vegetable is rinsed with the second aqueous solution within 30 minutes after completing the application to the outer surface of the fruit or vegetable.

17. The method of claim 1, wherein the fruit or vegetable is rinsed with the second aqueous solution within 10 minutes after completing the application to the outer surface of the fruit or vegetable.

18. The method of claim 1, wherein the fruit or vegetable is rinsed with the second aqueous solution within 5 minutes after completing the application the outer surface of the fruit or vegetable.

19. The method of claim 1, wherein the fruit or vegetable is rinsed with the second aqueous solution within 1 minutes after completing the application the outer surface of the fruit or vegetable.

20. The method of claim 1, wherein the total amount of (i) and (ii) in the first aqueous solution is 5 to 60% by weight.

21. The method of claim 1, wherein the total amount of (i) and (ii) in the first aqueous solution is 10 to 50% by weight.

22. The method of claim 1, wherein the total amount of (i) and (ii) in the first aqueous solution is 15 to 35% by weight.

* * * * *